United States Patent Office 2,860,128
Patented Nov. 11, 1958

2,860,128

TRIAZINE DISAZO-DYESTUFFS

Raymond Gunst, Binningen, Switzerland, assignor to Ciba Limited, Basel, Switzerland, a Swiss firm No Drawing. Application July 1, 1957
Serial No. 668,917

Claims priority, application Switzerland July 3, 1956

8 Claims. (Cl. 260—153)

This invention provides valuable new disazo-dyestuffs, which are suitable for dyeing cellulosic fibrous materials and correspond to the formula (1)    D—N=N—A—X in which D represents the residue of a diazo-component containing at least one sulfonic acid group and an azo linkage, A represents the residue of a coupling component of the benzene series, and X represents a residue of the formula

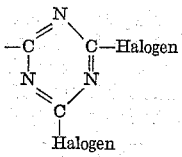

which is bound to A through a

grouping (in which $n$ represents a positive whole number).

The disazo-dyestuffs which correspond to the Formula 1 can be obtained by condensing a trihalogen-triazine, especially 2:4:6-trichloro-1:3:5-triazine (cyanuric chloride) with a disazo-dyestuff of the formula (2)    D—N=N—A—NH
                    |
               $C_{n-1}H_{2n-1}$ in which D represents the residue of a diazo-component containing at least one sulfonic acid group and an azo linkage, A—NHC$_{n-1}$H$_{2n-1}$ represents the residue of a coupling component of the benzene series, and $n$ represents a positive whole number, and advantageously 1.

The dyestuffs of the Formula 2 can be made by coupling a diazo-component containing a sulfonic acid group and an azo linkage with a coupling component of the benzene series which contains an at most secondary amino group and advantageously a primary amino group.

As coupling components of this kind there may be used amines of the benzene series which owe their capacity for coupling to the presence of an at most secondary amino group. As such amines there may be used, for example, aminobenzenes which are free from sulfonic acid groups, such as ω-methane sulfonic acid derivatives of aniline or of ortho-methoxy-aniline or of ortho-carboxy-aminobenzene (the ω-methane sulfonic acid group being split off hydrolytically to liberate the amino group after the production of the dyestuff) and also meta-toluidine, 3-acetyl-amino-1-aminobenzene, 3-ureido-1-aminobenzene, 1-amino-2-methyl-5-methoxybenzene, 1-amino-2:5-dimethoxy or -diethoxy-benzene, 1-amino-3-methoxybenzene, 4-amino-2-methoxy-5-isopropylbenzene or 1-amino-2:5-dimethylbenzene.

The diazo components to be coupled with these coupling components must contain, in addition to a diazotisable amino group, an azo linkage and at least one sulfonic acid group. In addition to the sulfonic acid group and the azo linkage, they may contain further substituents imparting solubility in water for example, carboxy and/or ortho-hydroxy groups (each of which is in ortho-position to the diazotisable amino group or, when both groups are present stand in a position vicinal to one another) and also groups not imparting solubility in water. It will therefore be understood that for producing the dyestuffs of the Formula 2 there are used as diazo-components amino-azo-dyestuffs such as those which are obtainable by coupling one of the aforesaid coupling components of the benzene series containing —NH$_2$ groups mentioned above in defining A, with a diazo-compound of an amino-sulfonic acid, for example, which diazotised 1-aminobenzene-2-, -3- or -4-sulfonic acid, 2-amino-1-methoxybenzene-4-sulfonic acid, 3-amino-2-hydroxybenzoic acid-5-sulfonic acid, 5-amino-2-hydroxybenzoic acid-3-sulfonic acid, 2-aminophenol-4-sulfonic acid, 2-aminobenzoic acid-4- or -5-sulfonic acid, 1-aminonaphthalene-5- or -6-monosulfonic acid, 2-aminonaphthalene-4-, -6- or -7-sulfonic acid, 1-aminonaphthalene-3:6-disulfonic acid, 2-aminonaphthalene-4:8-disulfonic acid or -6:8-disulfonic acid, 3-aminopyrene-5:8- or -5:10-disulfonic acid, 4-nitro-4'-aminostilbene-2:2'-disulfonic acid, and also the O-Acyl-derivatives of 1-amino-8-hydroxynaphthalene-3:6- or -4:6-disulfonic acid, 2-amino-8-hydroxynaphthalene-6-sulfonic acid, 2-amino-5-hydroxynaphthalene-7-sulfonic acid, and also amino-azo-dyestuffs obtainable by coupling a coupling component containing a sulfonic acid group, such as 1-amino-naphthalene-6- or -7-sulfonic acid, 2-amino-8-hydroxynaphthalene-6-sulfonic acid, 2-amino-5-hydroxynaphthalene-7-sulfonic acid, 2-(4'-aminobenzoylamino)-5-hydroxynaphthalene-7-sulfonic acid, with any diazo-component, advantageously containing a sulfonic acid group, but also anilines, aminophenols, amino-salicylic acid, etc. which are free from sulfonic acid groups.

In order to prepare the dyestuffs of the Formula 2 used as starting materials in the present process there may also be used diazo-components containing azo-linkages, which are obtained by sulfonating azo-dyestuffs, which contain a diazotisable amino group or a substituent convertible into such a group after the sulfonating operation, for example, a nitro group or an R—CO—NH— group, in which R represents an acyl residue. As such dyestuffs there may be mentioned, for example, the amino-monoazo-dyestuffs which are obtained by sulfonating, for example, amino-azo-benzene or amino-azo-salicylic acids. There may also be used as diazo-components for making the dyestuffs of the Formula 2 amino-monoazo-dyestuffs which contain sulfonic acid groups and can be obtained by coupling a diazotised monoacyl-derivative of an aromatic diamine with a coupling component containing an aromatic hydroxy group or a keto-methylene group, and subsequently hydrolysing the acylamino-monoazo-dyestuff so obtained, for example, those obtainable by the hydrolysis of acylamino-monoazo-dyestuffs obtainable from phenols, naphthols, 5-pyrazolones, barbituric acids, hydroxyquinolines, β-keto-carboxylic acid derivatives and diazotised monoacyl-diaminobenzenes, monoacyl-diaminostilbene disulfonic acids and the like.

There may also be mentioned as diazo-components complex metal compounds of ortho:ortho'-dihydroxyazo- or ortho-carboxy-ortho'-hydroxyazo-dyestuffs which contain a sulfonic acid group and a diazotisable amino group.

The amino-monoazo-dyestuffs referred to above for making the dyestuffs of the Formula 2 can be diazotised by methods in themselves known, for example, with the use of a mineral acid, especially hydrochloric acid, and sodium nitrite. The diazo-compounds so obtained may be coupled with the said amines of the benzene series by methods in themselves known.

Prior to condensation of the resulting amino-disazo-dyestuffs with cyanuric chloride the dyestuffs of the Formula 2 may, if desired, for the purpose of introducing an amino-benzoyl group, be condensed with 3- or 4-nitrobenzoyl chloride followed by reduction to a free amino group of the nitro group in the resulting nitrobenzoylated compound.

The finished dyestuff is advantageously condensed with a cyanuric trihalide in the presence of an acid-binding agent, such as sodium acetate or sodium carbonate.

Preferably the condensation is so carried out that two of the three exchangeable halogen atoms remain in the resulting condensation product. For this purpose, for example, the condensation may be carried out in a weakly acid to neutral medium and/or at as low a temperature as possible.

Notwithstanding the presence of labile halogen atoms in the dyestuffs of the Formula 2 they can be isolated and worked up into useful dry dyestuff preparations without losing their valuable properties. The isolation is advantageously carried out at as low a temperature as possible by salting out and filtration. The filtered dyestuffs may, if desired, after the addition of extenders or buffers, for example, a mixture of equal parts of a monoalkali phosphate and a dialkali phosphate. The drying is preferably carried out at not too high a temperature and under reduced pressure. In certain cases it is possible by spray drying the whole mixture resulting from the dyestuff manufacture to produce dry preparations directly, that is to say, without intermediate isolation of the dyestuff.

The new dyestuffs of the Formula 2 are suitable for dyeing or printing a very wide variety of materials, especially cellulosic fibrous materials, such as cellulose pulp, linen, regenerated cellulose and above all cotton. They are especially suitable for dyeing by the so-called cold dyeing process, in which the dyeing is produced at room temperature or a moderately raised temperature in an aqueous alkaline bath having a high salt content. In certain cases it is desirable, in order to improve the exhaustion of the dyebath or to improve the fixation of the dyestuff on the fiber, to heat to 90–100° C. at the end of the operation. The dyestuffs can also be applied by the so-called padding process or by printing methods, in which the dyestuff, after being applied to the goods to be dyed by foularding with a dyestuff solution or by printing with a printing paste, is subjected to a treatment with alkali and, if desired, heat, whereby the dyestuff is fixed on the material.

If the dyestuffs contain groups capable of forming metal complexes, for example, an orthohydroxy-carboxy-grouping, such as in present in a salicylic acid residue, dyeings produced with such dyestuffs may be treated with an agent yielding metal, for example, an agent yielding chromium or preferably an agent yielding copper. The treatment with the agent yielding metal may be carried out by the customary methods. In many cases very valuable dyeings are obtained by using the process in which a dyeing produced with the metal-free dyestuff is after-treated with an aqueous solution containing a water-soluble, and preferably complex, copper compound and a basic condensation product of formaldehyde with a compound containing at least once the atomic grouping.

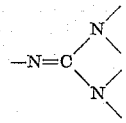

or a compound, such as cyanamide, which is easily convertible into a compound containing the aforesaid atomic grouping.

The dyeings obtained with the new dyestuff preparations on cellulosic fibers are generally distinguished by the purity of their tints, by their good fastness to light and above all by their excellent fastness to washing.

The following examples illustrate the invention, the parts and percentages being by weight unless otherwise stated and the relationship of parts by weight to parts by volume being the same as that of the kilogram to the liter:

Example 1

35.7 parts of 4 - amino-1:1'-azobenzene-3:4'-disulfonic acid are diazotised in known manner by means of sodium nitrite and hydrochloric acid. The diazo-compound is coupled with 10.7 parts of 3-methyl-aminobenzene in the presence of sodium acetate. The resulting disazo-dyestuff is isolated and purified by reprecipitation.

47.5 parts of the amino-disazo-compound so obtained are dissolved in 500 parts of water with the addition of sufficient sodium carbonate to produce a neutral solution. The solution is added to a suspension of 18.4 parts of cyanuric chloride in 300 parts of ice water, the solution is stirred for 1–2 hours at 0–5° C., and the reaction mixture is maintained weakly acid by the dropwise addition of a dilute solution of sodium carbonate. The condensation product so formed is then salted out by the addition of sodium chloride, filtered off, and dried in vacuo at as low a temperature as possible. There is obtained a brown powder, which dissolves in water with an orange coloration and dyes cotton from an alkaline bath containing sodium sulfate yellow-brown tints which are very fast to light and have remarkable properties of wet fastness.

By using in producing the disazo-dyestuff 12.1 parts of 3:6-dimethylaminobenzene, instead of 10.7 parts of 3-methylaminobenzene, and otherwise proceeding in an analogous manner, there is obtained a very similar dyestuff which likewise dyes cotton yellow-brown tints.

Example 2

18.5 parts of cyanuric chloride are dissolved with the aid of heat in 50 parts of acetone, and the solution is poured in the form of a fine jet into 300 parts of water and 200 parts of ice. The mixture is filtered, and the residue is stirred with 300 parts of ice and 200 parts of water. To the resulting suspension is added a neutral solution in 1000 parts by volume of water of 56.9 parts of the disazo-dyestuff, obtained by diazotising the monoazo-dyestuff prepared from meta-toluidine and diazotised 2 - aminonaphthalene - 4:8-disulfonic acid and coupling the diazotising dyestuff with 1-amino-2-methoxy-5 - methylbenzene. The condensation is advantageously carried out at a pH value of 5.5 to 6.5. The free acid liberated is neutralised in a 1 N-solution of sodium hydroxide. As soon as 100 parts by volume of the 1 N-solution of sodium hydroxide have been consumed, the dyestuff is salted out and dried in vacuo at 45° C. There is obtained in this manner an orange powder, which dissolves in water and dyes cotton from salt-containing alkaline baths fast orange tints.

A dyestuff which dyes cotton somewhat more yellow tints is obtained by using for the condensation with cyanuric chloride the disazo-dyestuff obtained by coupling diazotised 2 - aminonaphthalene-4:8-disulfonic acid with 1-amino-methylbenzene, then further diazotising and coupling with 1-amino-2-methylbenzene.

Similar dyestuffs which dye cotton somewhat more reddish tints are obtained by using as first component 1-aminonaphthalene-3,6 - disulfonic acid instead of 2-aminonaphthalene-4,8-disulfonic acid.

Example 3

51 parts of the amino-azo-dyestuff (obtained by coupling diazotised 1-aminobenzene-3-sulfonic acid with 1-aminonaphthalene-6-sulfonic acid, then further diazotising and coupling with aniline) are dissolved in 1000 parts of water with the addition of the quantity of sodium carbonate calculated to produce a neutral solution, and condensation with 18.5 parts of cyanuric chloride is carried out as described in Example 2. The dyestuff so obtained dyes cotton from salt-containing alkaline baths fast brown-orange tints.

*Example 4*

1 part of the dyestuff obtained as described in the first paragraph of Example 2 is dissolved in 2000 parts of water. In the dyebath so obtained there are entered at 25–35° C. 100 parts of well wetted cotton yarn. In the course of 30 minutes 500 parts of a sodium chloride solution of 20% strength are added in portions. After a further 10 minutes 70 parts of a potassium carbonate solution of 8% strength are added, the bath is heated to 90° C. and dyeing is continued for a further 60 minutes at that temperature.

After being rinsed with cold water, the dyeing so obtained is soaped for 15 minutes at 85–100° C., thoroughly rinsed with cold water and dried. There is obtained an orange dyeing of very good fastness to washing.

What is claimed is:

1. A water soluble disazo dyestuff which in its free acid state corresponds to the formula

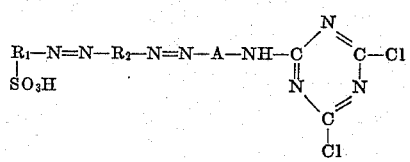

wherein $R_1$ and $R_2$ each represents a member selected from the group consisting of a benzene and a naphthalene radical and A represents a benzene radical bound to the azo linkage in p-position relatively to the NH-group.

2. A water soluble disazo dyestuff which in its free acid state corresponds to the formula

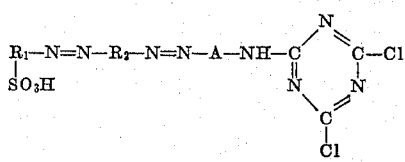

wherein $R_1$ represents a benzene radical and $R_2$ and A each represents a benzene radical.

3. A water soluble disazo dyestuff which in its free acid state corresponds to the formula

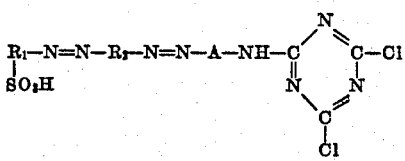

wherein $R_1$ represents the radical of a naphthalene sulfonic acid and $R_2$ and A each represent a benzene radical.

4. A water soluble disazo dyestuff which in its free acid state corresponds to the formula

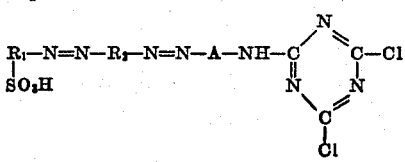

wherein $R_1$ represents a benzene radical, $R_2$ the radical of a naphthalene sulfonic acid bound to the azo linkages in the 1- and 4-positions and A represents a benzene radical.

5. The dyestuff which in its free acid state corresponds to the formula

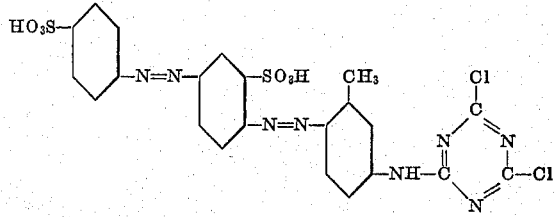

6. The dyestuff which in its free acid state corresponds to the formula

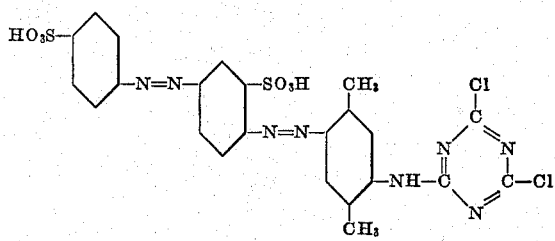

7. The dyestuff which in its free acid state corresponds to the formula

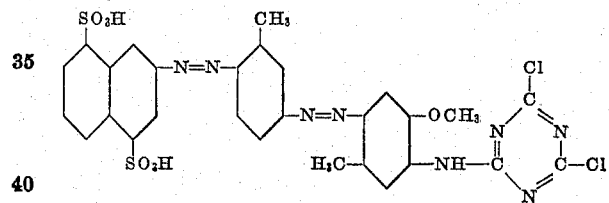

8. The dyestuff which in its free acid state corresponds to the formula

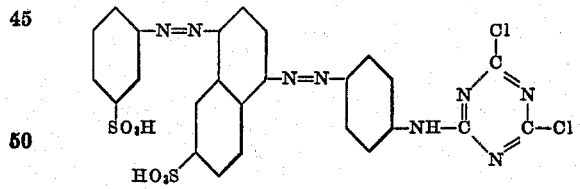

References Cited in the file of this patent

UNITED STATES PATENTS

| | | |
|---|---|---|
| 1,808,849 | Hentrich et al. | June 9, 1931 |
| 1,958,327 | Winkler | May 8, 1934 |
| 2,722,527 | Wehrli et al. | Nov. 1, 1955 |

OTHER REFERENCES

Boyle: The Industrial Chemist, pp. 331–333 August 1939.

UNITED STATES PATENT OFFICE
CERTIFICATE OF CORRECTION

Patent No. 2,860,128                                          November 11, 1958

Raymond Gunst

It is hereby certified that error appears in the printed specification of the above numbered patent requiring correction and that the said Letters Patent should read as corrected below.

Column 1, line 69, for "-amno-" read -- -amino- --; column 2, line 15, for "which" read -- with --.

Signed and sealed this 2nd day of June 1959.

(SEAL)
Attest:

KARL H. AXLINE                                                ROBERT C. WATSON
Attesting Officer                                             Commissioner of Patents